(12) United States Patent
Scales (10) Patent No.: US 11,731,313 B2
(45) Date of Patent: Aug. 22, 2023

(54) ARTICULABLE EROSION CONTROL MATTRESS, MANUFACTURING SYSTEM, MATTRESS ROLLING SYSTEM, AND METHODS

(71) Applicant: John M. Scales, Peachtree Corners, GA (US)

(72) Inventor: John M. Scales, Peachtree Corners, GA (US)

(*) Notice: Subject to any disclaimer, the term of this patent is extended or adjusted under 35 U.S.C. 154(b) by 161 days.

(21) Appl. No.: 17/432,762

(22) PCT Filed: Jul. 15, 2020

(86) PCT No.: PCT/US2020/042208
§ 371 (c)(1),
(2) Date: Aug. 20, 2021

(87) PCT Pub. No.: WO2021/011706
PCT Pub. Date: Jan. 21, 2021

(65) Prior Publication Data
US 2022/0063128 A1    Mar. 3, 2022

Related U.S. Application Data

(60) Provisional application No. 62/987,404, filed on Mar. 10, 2020, provisional application No. 62/875,422, filed on Jul. 17, 2019.

(51) Int. Cl.
*E02D 17/20* (2006.01)
*E02B 3/14* (2006.01)
(Continued)

(52) U.S. Cl.
CPC ............ *B28B 7/263* (2013.01); *B28B 5/10* (2013.01); *B28B 7/348* (2013.01); *E02B 3/123* (2013.01);
(Continued)

(58) Field of Classification Search
CPC ........ E02B 3/123; E02D 17/20; E02D 17/205
See application file for complete search history.

(56) References Cited

U.S. PATENT DOCUMENTS 2,361,163 A * 10/1944 Arthur .................... E01C 9/083
14/71.1
2,454,292 A * 11/1948 Pickett .................... E02B 3/123
405/20
(Continued)

FOREIGN PATENT DOCUMENTS

WO    2018/208716 A1    11/2018

OTHER PUBLICATIONS

International Search Report and Written Opinion for Application No. PCT/US2020/042208 dated Nov. 23, 2020, 13 pages.

*Primary Examiner* — Benjamin F Fiorello
(74) *Attorney, Agent, or Firm* — Baker Donelson; Carl M. Davis, II (57) ABSTRACT

An articulating mattress of blocks interconnected with tensiles seated therein, said blocks having opposing longitudinal and transverse sides and a top surface each of a smooth surface by contact with a mold surface during casting and a bottom surface having a rough surface by screeding the flowable casting material from an open side of a mold formwork. The mattress inverted with a rolling apparatus for installation with the rough surface in frictional contact on a ground surface for erosion control, said mattress rolling apparatus having base, front wheels, and steerable rear wheels, with a rolling mechanism for rolling the articulating mattress. An apparatus and a method of casting an articulable mattress with a rough bottom surface for erosion control are disclosed.

30 Claims, 8 Drawing Sheets

(51) Int. Cl.
*B28B 7/26* (2006.01)
*B28B 5/10* (2006.01)
*B28B 7/34* (2006.01)
*E02B 3/12* (2006.01)

(52) U.S. Cl.
CPC .......... *E02D 17/207* (2013.01); *E02D 17/205* (2013.01)

(56) References Cited

U.S. PATENT DOCUMENTS

| | | | | |
|---|---|---|---|---|
| 2,570,271 A | * | 10/1951 | Pickett | E02B 3/121 405/17 |
| 4,242,010 A | * | 12/1980 | Gjerde | F16L 1/123 405/172 |
| 4,286,895 A | * | 9/1981 | Poli | E02B 3/14 405/16 |
| 4,854,773 A | * | 8/1989 | Nicoll | E02B 3/12 405/15 |
| 4,940,364 A | * | 7/1990 | Dlugosz | E01C 5/22 52/576 |
| 5,129,462 A | | 7/1992 | Mail | |
| 5,486,066 A | | 1/1996 | Hagenah | |
| 5,846,023 A | * | 12/1998 | Angel | F16L 1/123 405/172 |
| 8,678,705 B1 | * | 3/2014 | Smith | E02B 3/14 405/20 |
| 9,187,902 B2 | | 11/2015 | Krasnoff | |
| 10,392,764 B1 | * | 8/2019 | Sanchez | E02B 3/14 |
| 2004/0101368 A1 | * | 5/2004 | Daigle | E02B 3/123 405/15 |
| 2017/0239852 A1 | * | 8/2017 | Motz | B29C 39/18 |
| 2017/0275839 A1 | | 9/2017 | Motz et al. | |
| 2017/0313534 A1 | | 11/2017 | Motz et al. | |
| 2019/0071837 A1 | * | 3/2019 | Krasnoff | C04B 20/008 |
| 2019/0176373 A1 | | 6/2019 | Motz et al. | |

* cited by examiner

ARTICULABLE EROSION CONTROL MATTRESS, MANUFACTURING SYSTEM, MATTRESS ROLLING SYSTEM, AND METHODS

TECHNICAL FIELD

The present invention relates to articulable erosion control mattresses for overlying ground surfaces with a plurality of interconnected spaced-apart blocks. More particularly, the present invention relates to articulable erosion control mattresses having a plurality of interconnected spaced-apart blocks that each have a rough bottom surface for frictionally engaging a ground surface for erosion control, as well as a system for forming and rolling a flexible concrete mattress and more particularly, system and method of rolling a flexible concrete mattress such that the mattress is inverted for installation by unrolling on an installation site, while providing blocks with smooth side walls and top surface.

TERMS AND DEFINITIONS

The term "smooth" as used herein refers to a surface of a cementitious block that is molded of a flowable cement mixture material in contact with planar walls of a mold formwork so that the resulting surfaces are finished, even and untextured without hand-sensible projections and recesses. Particularly, the cast block of the present invention has side surfaces and a top surface that have smooth surfaces.

The term "rough" as used herein refers to a surface of the cementitious block that results from leveling the flowable mixture in the mold formwork with a screed, and particularly in the embodiments of the present invention, the use of the screed levels the mixture at an open upper surface of the mold. A screed is a straight edge device used in a manner to level the concrete mixture in the mold formwork by a sweeping motion of the screed across the upper surface of the mold formwork. A screed may be an elongated board or metal strip dragged across a freshly poured concrete slab to give it its proper level. The screed leaves a textured, uneven, or irregular surface, hand-sensible projections and recesses but generally observably level. Particularly, the present invention casts the block with a bottom surface upwardly, which upon screeding of an open end of the mold formwork, results in a rough surface for the cast block having an irregular uneven textured surface and with hand-sensible projections and recesses for engaging ground surfaces with increased frictional contact compared to frictional contact by a smooth surface.

The present invention provides an articulable erosion control mattresses having a plurality of interconnected spaced-apart blocks that each have a rough bottom surface for frictionally engaging a ground surface for erosion control, as well as a system for manufacture of the flexible concrete mattress and a system and method of rolling the flexible concrete mattress such that the mattress is inverted for installation by unrolling on an installation site, while providing smooth side walls and top surface, which mattress having interconnecting tensiles allows articulation for conforming to un-even ground surfaces for erosion control while being readily rollable for handling as a roll of the elongated mattress.

BACKGROUND OF THE INVENTION

Naturally occurring environmental conditions have caused the erosion of land since the beginning of time. This erosion may be exasperated by manmade conditions which cause the increase of the flow of water or wind across the surface of the land, along riverbanks, and the like. As such, people have been devising structures which help mitigate the erosion of land.

A common practice of such mitigation has been to construct of surface layer of rock to retain the soil. A furtherance of this practice has been the development of large mattresses or mats formed of interconnected concrete blocks or portions. These large concrete mats are difficult to form, and even more difficult to transport and install due to their extremely heavy weight and mass. Therefore, machines have also been devised to help form, move and install these flexible concrete mats. However, these machines have proven to be very large and complicated to operate in an efficient manner.

The articulating mattresses formed of cast blocks assemble with interconnecting tensiles for use as a mat in covering ground surfaces for erosion control. The blocks are cast individually in mold formworks with a curable solidifiable flowable material such as a cementitious mixture. The mold formworks have a honeycomb of side walls that taper inwardly to an upper edge. This allows the mold to be lifted from the solidified cured blocks. The blocks are cast top side up. The mold formwork defines perpendicular tunnels between respective lateral sides and between opposing front and back sides of the cast block. After casting, tensiles are inserted through the blocks for forming a mattress assembly. The assembled mattress provides an array of spaced-apart cement blocks for covering a large area of ground; for example, a 40-foot length by 8-foot width having 12 spaced-apart longitudinally extending rows of spaced-apart blocks and 60 spaced-apart transverse extending rows of space-apart blocks.

While the resulting articulating mattress provides for erosion control, there are drawbacks in the manufacture and handling of these large heavy mats. Assembly of articulating mats is labor and time intensive. The blocks are cast as an array of blocks disposed in spaced relation after removing the mold formwork. Subsequently, the tensiles are threaded through the tunnels in the blocks for interconnecting longitudinal rows of the blocks and adjacent blocks of the spaced rows interconnect with transverse tensiles. The mat may then be picked-up with a hoist for loading onto a truck trailer for transport and installation at a ground site.

Alternatively, blocks may be cast with opposing separable forms for enclosing the tensiles medial between bottom and top portions of the block. This casting centrally locates the tensiles but still requires significant labor for manufacture. The two-part mold formwork also requires both the top and bottom formwork to taper resulting in the bottom half of the block to have a smaller soil area.

The casting provides blocks for the articulating mat mattress with a top surface facing upwards and a bottom surface downward for placing in contact with a ground surface to be protected from erosion. However, the mattress top surface is rough or irregular because the flowable material is screed to level the top surface during casting. A more attractive smooth surface is provided for the bottom that has the concrete mixture in contact with a surface of the mold formworks. Thus, the articulating mats have side walls of a smooth preferred finish which is distinctive from the rough finish on the top surface while the unseen bottom surface has the preferred smooth visual finish. Preferably however, a rough surface provides improved frictional engagement with the ground to resist sliding of the mat placed for erosion control.

Accordingly, there is a need in the industry for casting and assembly of articulable mats of interconnected blocks for erosion control mattresses, for a manufacturing apparatus, and for a rolling apparatus that inverts the articulable erosion control mattress for handling and for installation by unrolling rough bottom surface downwardly on an installation site, while providing smooth side walls and top surface. It is to such that the present invention is directed.

SUMMARY OF THE INVENTION

The present invention meets the need in the art by providing a method of making an articulable erosion control mattress of interconnected cast blocks, comprising the steps of:

(a) providing a mat formwork having a plurality of mold cavities for casting blocks arranged in an array of a plurality of spaced-apart longitudinal rows, each of said mold cavities having longitudinally spaced opposing side walls and transverse opposing side walls that cooperatively define on respective edges an open end of the mold cavity and a closing surface opposing the open end, each side wall having a slot extending from the edge to a distal end intermediate the edge and the closing surface;

(b) interconnecting the mold cavities in each longitudinal row with a respective one of a plurality of elongated tensiles, a portion of said one elongated tensile seated at the distal end of a respective slot of the longitudinally spaced opposing side walls of each mold cavity;

(c) interconnecting the mold cavities in adjacent longitudinal rows with a respective another one of the plurality of elongated tensiles, a portion of said another one elongated tensile seated at the distal end of a respective slot of the transverse spaced opposing side walls of each mold cavity; and (d) filling a flowable solidifable casting material into the mold cavities to the edges to embed the elongated tensiles therein, whereby the sides and the closing surface form smooth surfaces for the cast block.

In another aspect, the present invention provides an articulable erosion control mattress of interconnected blocks, comprising a plurality of blocks spaced-apart in an array of a plurality of spaced-apart longitudinal rows and transverse columns, said blocks having opposing longitudinal sides and opposing transverse sides. A plurality of tensiles interconnect the spaced-apart blocks, with one tensile of the plurality of tensiles interconnecting each of the blocks in a respective row, the said one tensile extending into and through a respective block from a first longitudinal side through an opposing longitudinal side outwardly to connect to an adjacent one of the blocks in the respective row, said one tensile seated intermediate opposing top and bottom surfaces in said first longitudinal side and opposing longitudinal side. Another one of the plurality of tensiles interconnecting each of the blocks in a respective one of the transverse columns to a transverse adjacent block in an adjacent longitudinal row, the said another tensile extending into and through the respective block from a first transverse side through an opposing transverse side outwardly to connect to said transverse adjacent block in the adjacent longitudinal row, said another one tensile seated intermediate opposing top and bottom surfaces in said first transverse side and opposing transverse side. The tensiles seat inwardly within the blocks spaced from the bottom surface of the blocks and the articulable mattress being disposed with the bottom surfaces of the blocks on a ground surface, provides for control of erosion.

In another aspect, the present invention provides a concrete mat forming and rolling system for use in forming a concrete mat and rolling the concrete mat for transportation to an installation site, comprising a movable trolley having a base, a pair of first wheels coupled to said base a first select distance from each other, and a mat roller system mounted to said base, said roller system including a roller and a roller drive for forcibly rotating said roller, and said roller having a mat coupler. A concrete mat formwork having a plurality of mutually aligned block molds, said concrete mat formwork having a width of a second select distance less than said first select distance. A concrete mat being formed within the concrete mat mold formwork is coupled to the roller of the movable trolley, whereby rotation of the roller causes the concrete mat to rise and be rolled about the roller.

In another aspect, the present invention provides a concrete mat forming and rolling system that comprises a base, a plurality of wheels coupled to the base, a roller coupled to the base for rotational movement, the roller having at least one mat catch which secures an end of a concrete mat to the roller, and a motor coupled to the roller to cause rotation of the roller.

In another form, the invention provides a method of forming and rolling a length of concrete block mat for installation at a site, which comprises the steps of providing a concrete mat formwork configured to form a mat of interconnected concrete blocks, inserting a network of tensiles within the formwork for interconnecting of the concrete blocks, casting concrete into the formwork with a bottom surface of the concrete blocks facing upwardly, curing the concrete blocks, providing a roller, coupling a leading edge of the mat of interconnected concrete blocks to the roller, rotating the roller in a first direction to extract the mat of interconnected concrete blocks from the concrete mat formwork and to roll the mat of interconnected concrete blocks about the roller with the bottom surface of the mat of interconnected concrete blocks facing outwardly, whereby the rolled mat of interconnected concrete blocks being transported to an installation site, for placing the rolled mat of interconnected concrete blocks upon a surface at the installation site with the bottom surface of the mat of interconnected concrete blocks facing downwardly at the point of contact with the surface, and unrolling the rolled mat of interconnected concrete blocks upon the surface at the installation site.

In another aspect, the invention provides a method of forming and installing a length of concrete block mat, which comprises the steps of providing a concrete mat formwork configured to form a mat of interconnected concrete blocks, inserting a network of tensiles within the formwork for interconnecting of the concrete blocks, casting concrete into the formwork with a bottom surface of the concrete blocks facing upwardly, curing the concrete blocks, removing the concrete mat from the formwork, placing the concrete mat on a surface, providing a roller, coupling a leading edge of the mat of interconnected concrete blocks to the roller, rotating the roller in a first direction to lift the mat from the surface and to roll the mat of interconnected concrete blocks about the roller with the bottom surface of the mat of interconnected concrete blocks facing outwardly, whereby the rolled mat of interconnected concrete blocks being transported to an installation site for placement on a surface with the bottom surface of the mat of interconnected concrete blocks facing downwardly at a point of contact with the surface at the installation site, and unrolling the rolled mat of interconnected concrete blocks upon the surface at the installation site.

In another form, the present invention provides a method of rolling a concrete block mat having a plurality of cement blocks interconnected in spaced relation with a network of tensiles, the concrete mat cast in a formwork configured for receiving the tensiles and cement with a bottom surface of the concrete blocks facing away from the formwork, comprising the steps of:

(a) coupling to a rotatable roller a leading edge of a mat of concrete blocks interconnected by a plurality of tensiles;

(b) rotating the roller in a first direction and rolling the mat of interconnected concrete blocks about the roller inverted with the bottom surface of the mat of interconnected concrete blocks facing outwardly, whereby the rolled mat of interconnected concrete blocks being transported to an installation site for placing upon a surface at the installation site with the bottom surface of the mat of interconnected concrete blocks facing downwardly at a point of contact with the surface, and unrolling the rolled mat of interconnected concrete blocks in a second direction upon the surface at the installation site.

Objects, advantages, and features of the present invention will become apparent upon a reading of the following detailed description in reference to the drawings and the appended claims.

DETAILED DESCRIPTION

Figure 1:
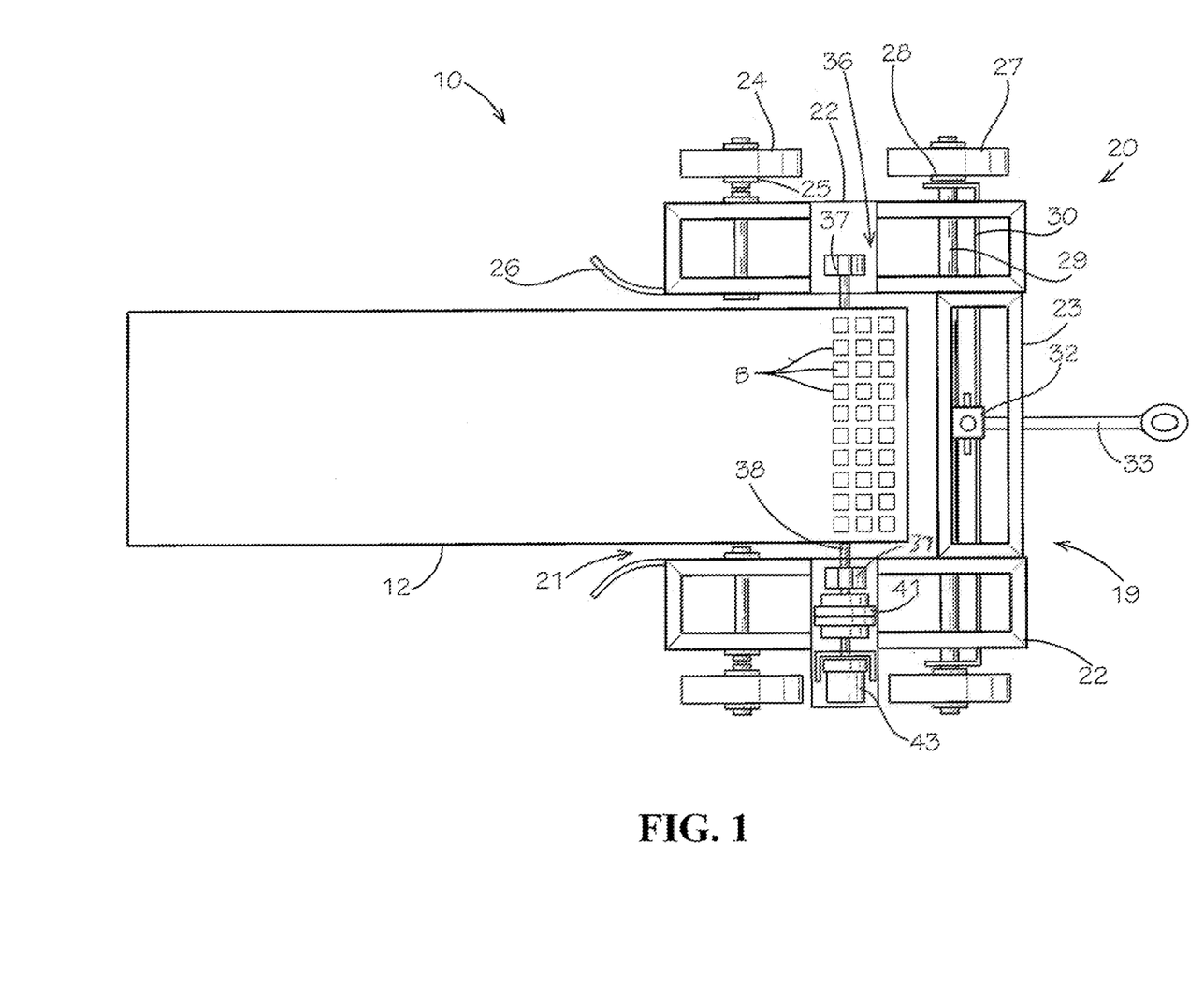
FIG. 1 illustrates a top view of a concrete mat forming and rolling system in accordance with the present invention.
Figure 5:
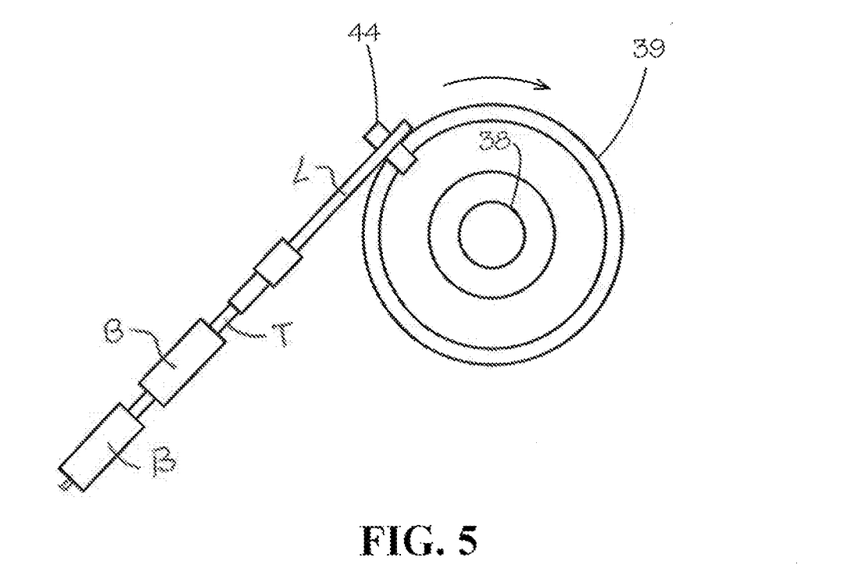
FIG. 5 illustrates a side view of a roller portion of the concrete mat forming and rolling system shown in FIG. 1.
Figure 10:
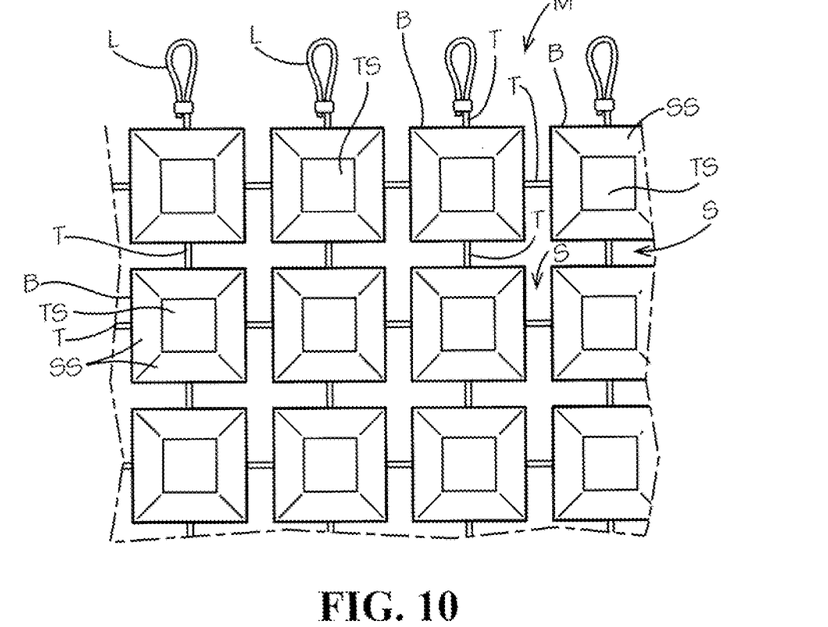
FIG. 10 illustrates a top view of a concrete mat formed by the concrete mat forming and rolling system shown in FIG. 1.

With reference to the drawings in which like parts have like reference numerals, FIG. 1 illustrates a flexible concrete mat forming and rolling system 10 in accordance with the present invention. The system 10 rolls a formed flexible articulatable-concrete mattress or mat M that includes a matrix or plurality of concrete blocks, modules, or pads B mutually aligned in interconnected fashion to each other through a series or network of flexible cables, wires, straps or chain tensile members (referenced herein as tensiles T) embedded within each block B. The longitudinally oriented ends of the tensiles T are bent over and coupled to form a closed end loop L, as best illustrated in FIG. 5 that illustrates a side view of a roller portion of the concrete mat forming and rolling system shown in FIG. 1 and FIG. 10 that illustrates the mat M in top plan view. Each block B is separated from the adjacent block B so that a space S is formed therebetween. The blocks B are generally rectangular or square in shape with a generally flat bottom surface BS, a generally flat top surface TS, and side surfaces SS having a beveled or sloped surface or, as illustrated, two-staged beveled surfaces (or more), between a bottom edge and a top edge. In the illustrated embodiment, the blocks B are square.

Figure 8:
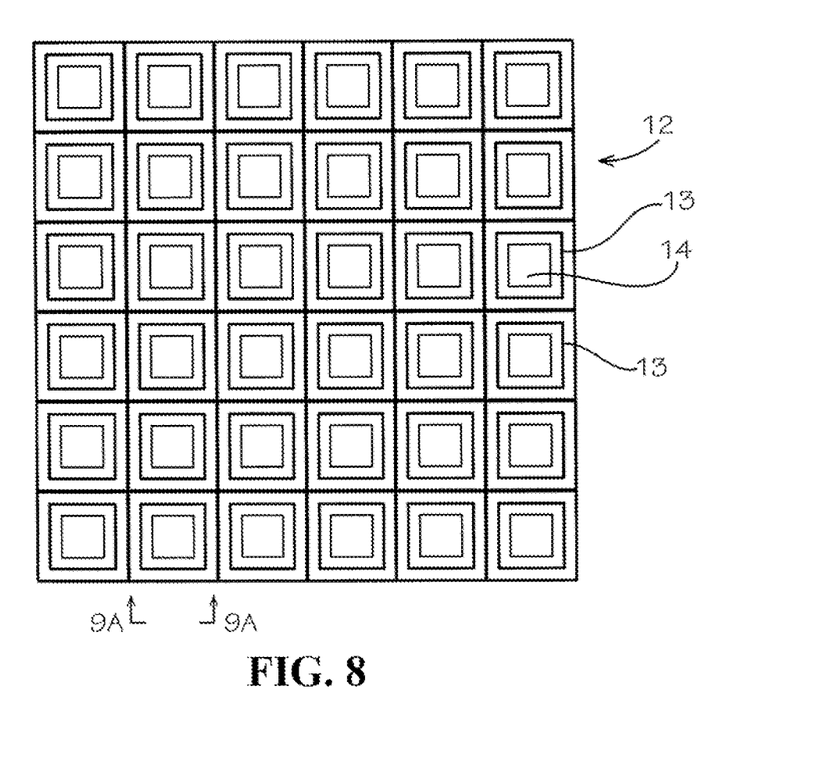
FIG. 8 illustrates a top view of a mold portion of the concrete mat forming and rolling system shown in FIG. 1.
Figure 9A:
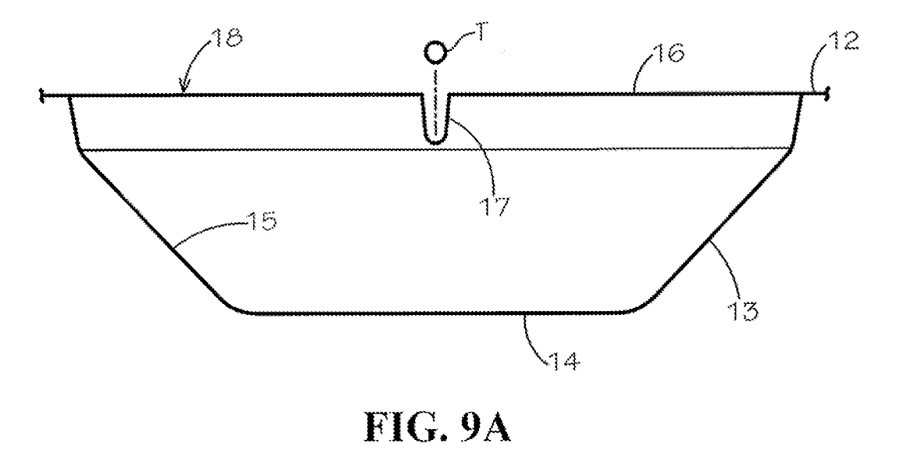
FIG. 9A illustrates a side view of a mold portion of the concrete mat forming and rolling system shown in FIG. 1.
Figure 9B:
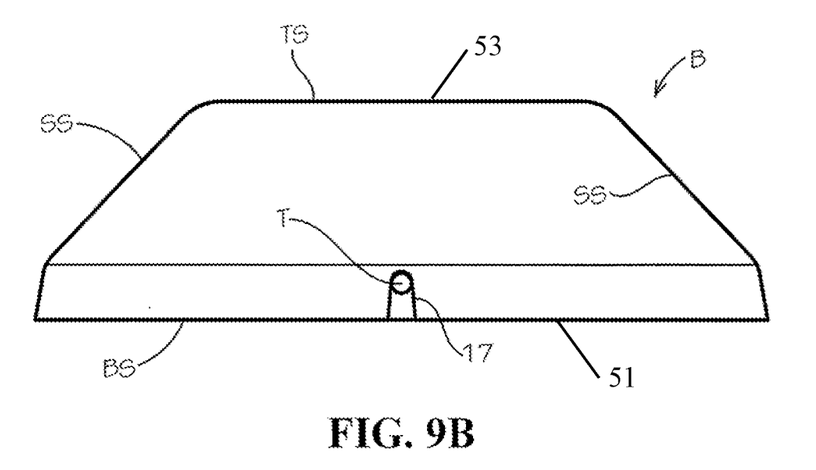
FIG. 9B illustrates a side view of a block in the concrete mat after inverting for installation on a ground surface.

The concrete mat M is formed with a thermoplastic, concrete mat formwork 12. The mat formwork 12 is comprised of a matrix, series, or plurality of mutually aligned individual block molds 13 shown in FIG. 8 in spaced-relation and in detail side cross-sectional view in FIG. 9A. The block mold 13 defines a cavity for receiving a curable material, such as a cementious mixture, for forming discrete blocks B. The block molds 13 in the illustrated embodiment are square, but may be of another shape including without limitation rectangular or circular, or other shape. The plurality of the block molds 13 are arranged in a desired formwork configuration having a select longitudinal length and a select horizontal width for a mat M. The formwork 12 is shown with reference to FIG. 8 in an illustrative embodiment as six (6) horizontal rows of block molds 13 by six (6) vertical columns of block molds 13 to form a total of 36 blocks per mat formwork. The number of rows or columns may be changed from that shown and is determined by the desired use and site conditions. As shown with reference to FIG. 9A showing the block mold 13 and FIG. 9B showing the block B inverted for installing on a ground surface, each block mold 13 has a bottom surface 14 that defines the top surface TS of the block during casting and subsequent installation with the block inverted for the top surface upward when the mat M is installed inverted at a site, and two-stage beveled side walls 15 that define the side surfaces SS of the block during casting. The side walls 15 includes a top edge 16 which has a central slot or notch 17. The side walls 15 define an open top 18, which when the block mold 13 is filled with concrete defines the bottom surface BS of the block B. The bottom surface has a rough surface 51 from the screed of the excess concrete, while the top surface cast in contact with the mold bottom surface 14 has a smooth surface 53.

In the illustrated embodiment, the formwork 12 is configured to provide a 48 inch by 48 inch mat section of the 36 interconnected beveled square blocks, and as shown in FIG. 9B, each block having the bottom surface BS of 6.5 inches square opposing the top surface TS 14 that is 4 inches square, and a-two-step tapering side surfaces SS. The block molds 13 in the illustrated formwork 12 are spaced 1.5 inches apart to define the space S between adjacent blocks B. The notch 17 has an opening of 0.25 inches and a depth of 0.5 inches, for receiving a ⅛-inch tensile cable, preferably a galvanized aircraft cable, or wire.

To form the concrete mat M of interconnected blocks B, a plurality of mat formwork 12 are placed or joined together side-by-side for a predetermined width and length for the mat M. The tensiles T are extended along each horizontal row of block molds 13 with the tensiles T positioned or residing within the mold slots 17. The ends of the horizontal rows of tensiles terminate with the closed end loops L. Similarly, tensiles T extend along each vertical column of block molds 13 with the tensiles T positioned or residing within the mold slots 17. The ends of the tensiles for the vertical columns may be positioned within the formwork cavity 13 so that they are left embedded within the resulting edge blocks B or alternatively, the opposing ends terminate a predetermined distance beyond an outward side of the respective edge block B. Uncured or viscous concrete is then poured into the formwork 12 through the open top 18 of the block mold 13. The viscous concrete is then screeded or leveled to form the bottom surface BS of the resulting block B. Thus, the tensiles T are embedded within the block B with all blocks B of the mat M interconnected through the tensiles T. The concrete is then allowed to cure within the block molds 13.

With continuing reference to FIG. 1, the system 10 also includes a cart or trolley 19 having a generally U-shaped base, platform, or frame 20 defining an internal space opening 21 extending inwardly from a front end of the trolley 19. The base 20 consists of two oppositely disposed legs or side rails 22 and a span or middle rail 23 extending between the two side rails 22. A pair of front wheels 24 mount to the front end of the base 20, with each front wheel 24 mounted to one side rail 22 through a wheel spindle and hub 25. A pair of curved mat guide plates 26 also mount to the front end to help guide the mat M during the rolling process.

Figure 6:
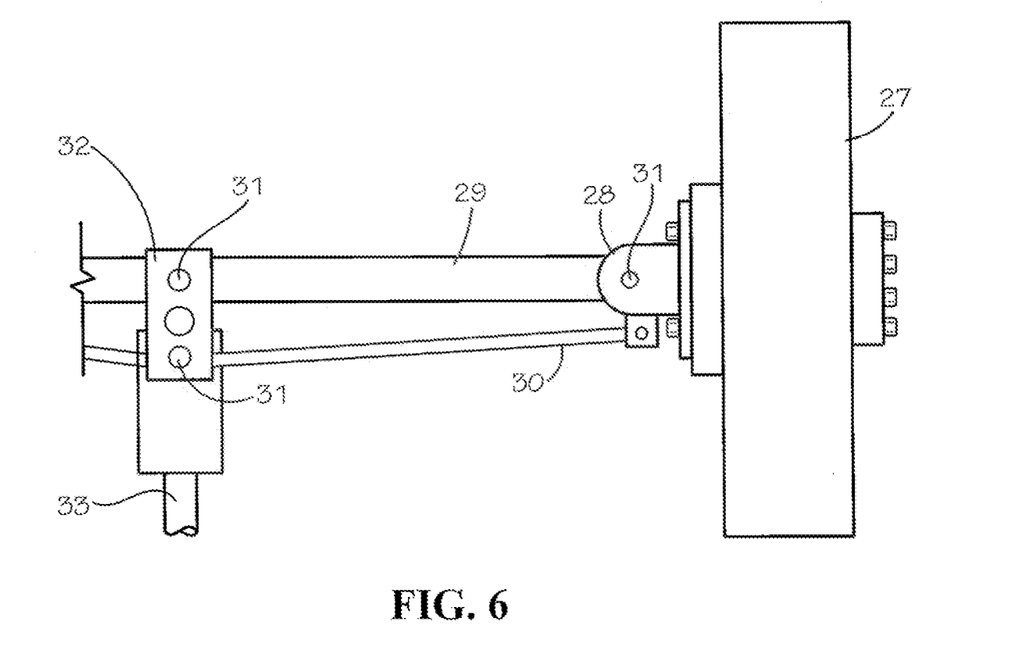
FIG. 6 illustrates an end view of a steering portion of the concrete mat forming and rolling system shown in FIG. 1.

FIG. 6 illustrates a partial end view of a steering portion of the concrete mat forming and rolling system 10 shown in FIG. 1. The trolley 19 has a pair of steerable rear wheels 27 mounted to the rear end of the base 20. Each rear wheel 27 has a rear hub 28 pivotally coupled to a rear beam 29 and pivotally coupled to a steering arm or rod 30. The steering rods 30 are coupled at an opposite end to a pivotal collar 32 of a steering handle 33 which is coupled to the beam 29.

Figure 3:
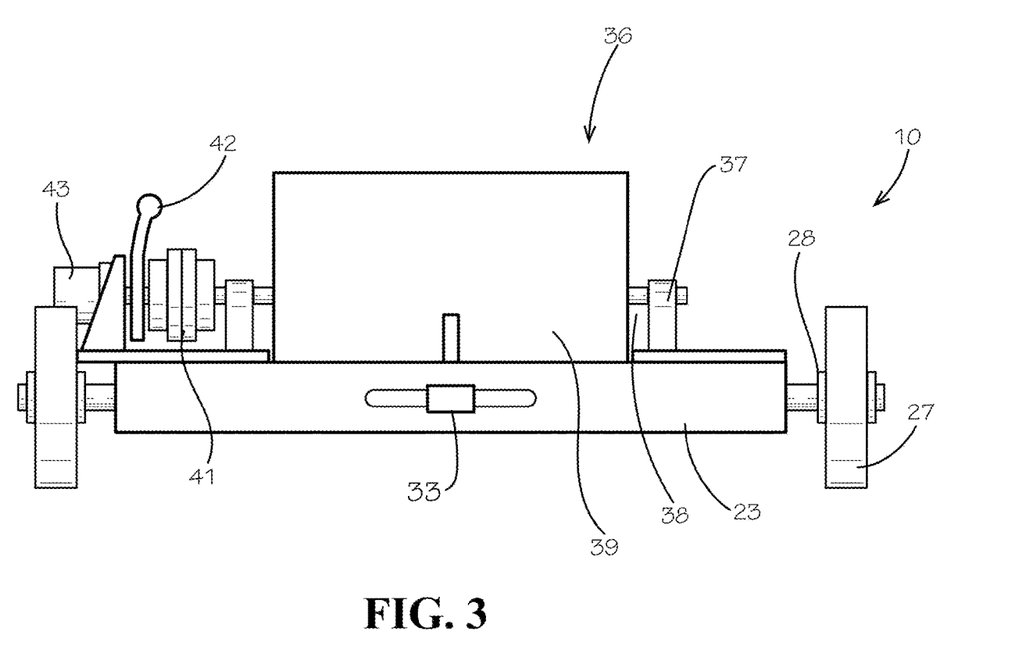
FIG. 3 illustrates an end view of the concrete mat forming and rolling system shown in FIG. 1.
Figure 7:
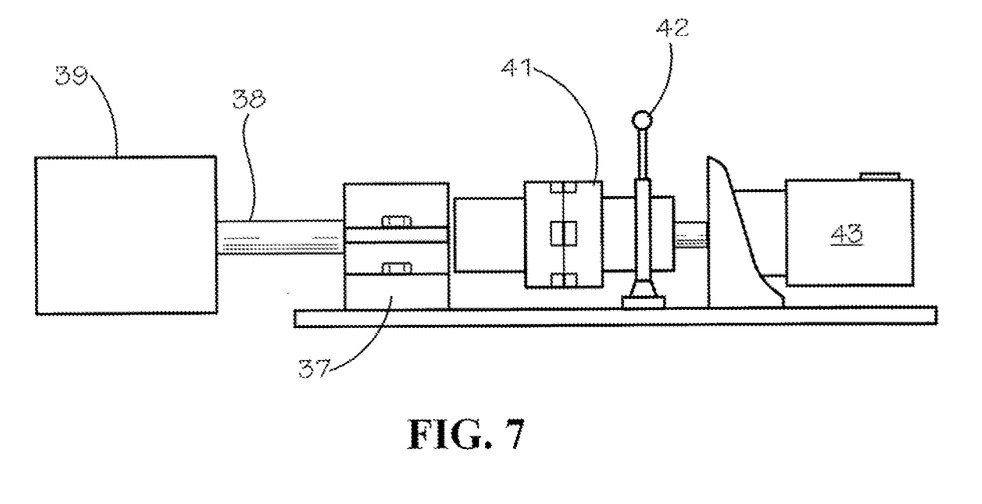
FIG. 7 illustrates the roller system of the concrete mat forming and rolling system shown in FIG. 1.

With continuing reference to FIG. 1, and with reference to FIG. 3 that illustrates an end view of the concrete mat forming and rolling system shown in FIG. 1, the trolley 19 also has a roller system or rolling mechanism 36 for rolling a length of mat M. The rolling mechanism 36 has a pair of roller bosses or plummer bearing block housings 37 mounted to the side rails 22 which are openable, releasable or separable to allow the release of an elongated steel roller shaft 38 therein. The roller shaft 38 is coupled to a larger diameter cylindrical steel roller or drum 39 which is generally positioned within or directly above the space 21 of the base 20. The roller shaft 38 is also coupled to a claw-type coupling clutch 41 which may be engaged through a pivotal clutch handle 42, as shown in FIG. 7. The clutch 41 is coupled to a low speed hydraulic motor 43 which rotates the shaft 38, and thus the drum 39.

Figure 4:
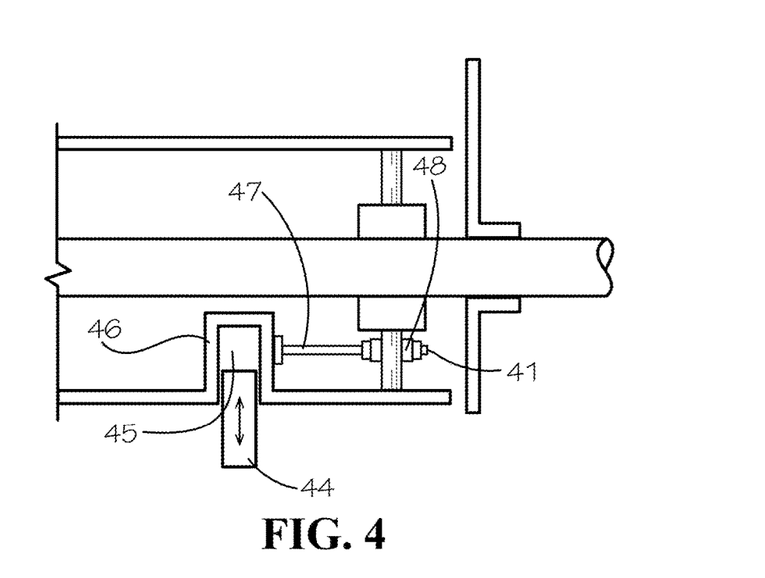
FIG. 4 illustrates a partial cross-sectional view of a roller portion of the concrete mat forming and rolling system shown in FIG. 1.

As illustrated in FIGS. 4 and 5, the cylindrical drum 29 has a series of mattress engaging portions, couplers, or catches 44 positioned and configured to capture or engage the loops L of the mat M. The catches 44 reciprocate between a retracted position within the drum 29 and an extended position extending outwardly from the drum, as shown in FIG. 4. Each catch 44 includes a reciprocating piston 45 that extends the catch 44 outwardly from the drum 39. The piston 45 resides within a chamber 46 coupled to a hydraulic or pneumatic line 47 and fitting 48. The fitting 48 is coupleable to an unshown high pressure source, so that high pressure drives the catches 44 outwardly from the respective chambers 46 to the extended position extending from the drum 39, while low pressure causes the catches 44 to be retracted to respective retracted positions within the circumference of the drum 39.

Figure 13:
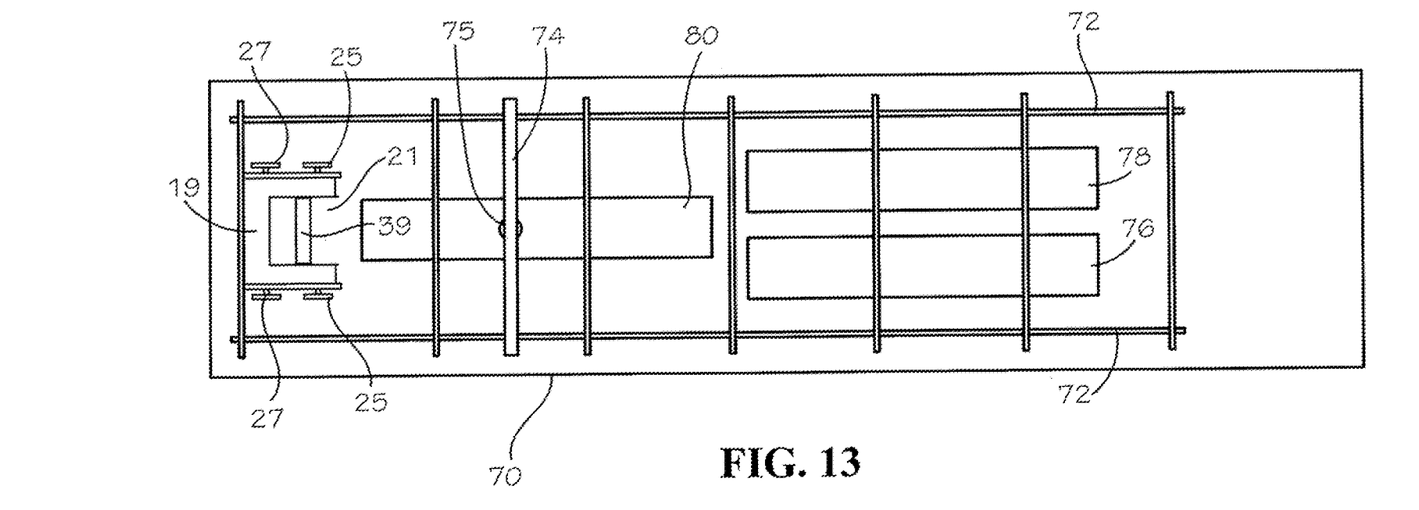
FIG. 13 illustrates in top plan view a schematic of an articulating concrete block mat casting and stripping workstation for casting and rolling concrete block mats for transportation and installation at an installation site.

FIG. 13 illustrates in top plan view a schematic diagram for an articulating concrete block mat casting and stripping workstation 70 for casting and rolling concrete block mats M for transportation and installation at an installation site. The workstation 70 includes elongated parallel rails 72 for a crane rail runway on which a crane bridge 74 having rollers moves selectively on the rails 72 within the workstation. The crane bridge 74 includes a hoist 75, preferably of at least 4000-pound capacity, and the hoist is operative for transverse movement on a hoist trolley while the crane bridge provides longitudinal movement on the rails. The workstation 70 includes a first casting/stripping station 76 and a second casting/stripping station 78, which are spaced apart between the rails 72. A laydown area 80 is spaced between the rails and longitudinally remote from the casting/stripping stations 76, 78. The trolley 19 is positioned proximate a first end of the laydown area 80 for rolling of concrete mats M moved by the crane bridge 74 from the casting/stripping stations 76 or 78 to the laydown area 80.

The system 10 is used for casting and rolling the articulating concrete block mats M. A plurality of the formwork 12 are joined together for defining an elongated mold for an elongated mat M. In the illustrated embodiment, a concrete mat having a length of 44 feet and a width of 8 feet uses two formworks 12 in each of 11 rows. The joined formwork is laid upon a surface, preferably substantially level, such as in the respective casting/stripping station 76, 78 shown in FIG. 13. The network of tensiles T is positioned into the slots 17 of each block mold 13. The tensiles T seat at a distal extent of the slot 17 as self-supporting within the block mold 13. Each block mold 13 is then filled with uncured concrete and allowed to cure over time. A screen levels the filled molds 12. Once the concrete is cured, the trolley 19 is positioned for rolling the mat M. This is accomplished by (a) positioning the trolley 19 directly above the mat formwork 12 at one end for removing the blocks from the molds 13 in sequence during rolling, or alternatively, (b) by moving the concrete mat M from the mold in the casting/stripping station 76, 78 to the remote lay-down area 80 and then positioning the trolley 19 for rolling the mat as discussed below.

The positioning of the trolley 19 places an end of the mat M within the internal space opening 21. With the pistons 45 pressurized, the catches 44 extend outwardly from the drum 39, and the loops L of the mat M are coupled to the catches 44, as shown in FIG. 5.

Figure 2:
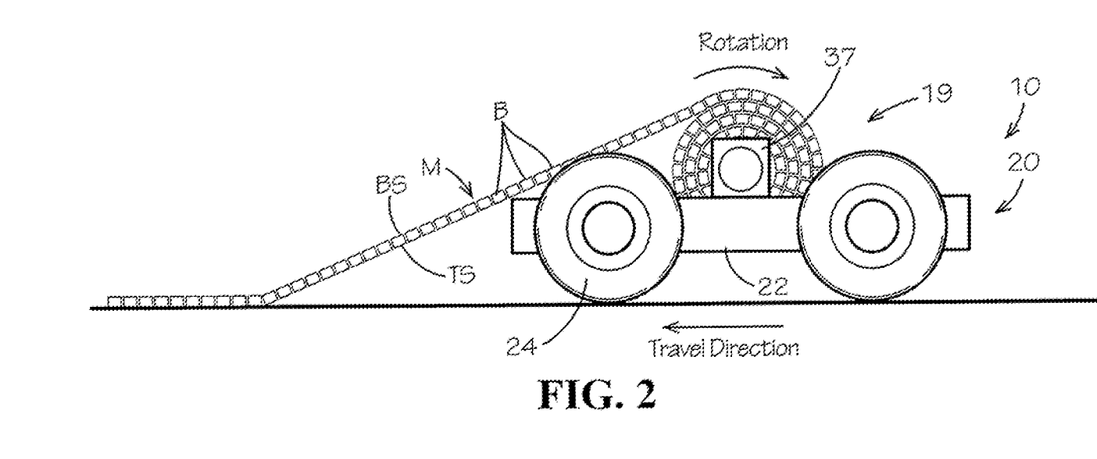
FIG. 2 illustrates a side view of the concrete mat forming and rolling system shown in FIG. 1.
Figure 2A:
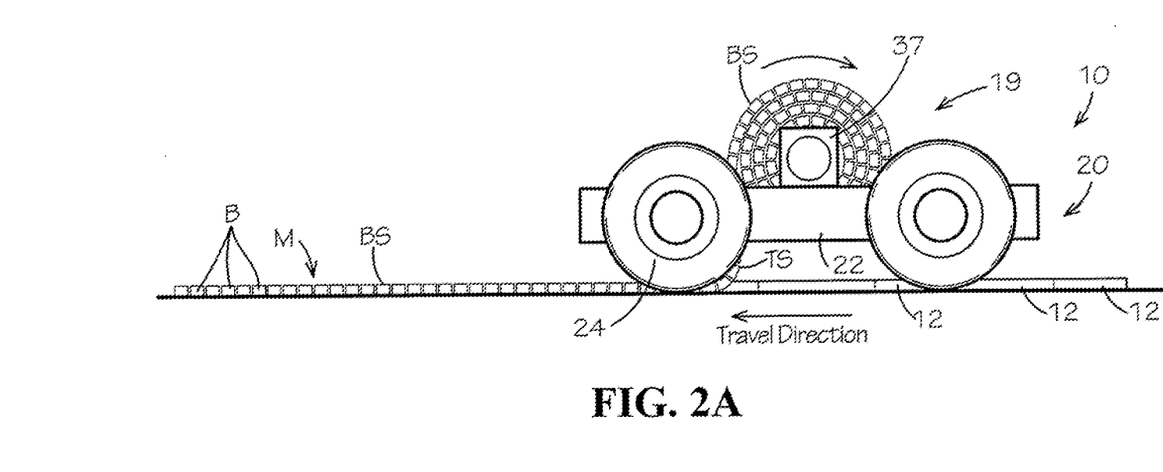
FIG. 2A illustrates a side view of the concrete mat forming and rolling system shown in FIG. 1, in which a trolley apparatus extracts the concrete mat from a mold framework, which mat rises vertically onto a roller upon rotation to roll the mat about the roller.

With operation of the hydraulic motor 43 and engagement of the clutch 41, the roller shaft 38, and therefore the drum 39, begins to rotate in a first direction (clockwise direction with respect to the drawings). (In the event the trolley 19 is positioned at the opposing end of the formwork (left on the drawing sheet), the drum 39 rotates clockwise.) The rotation of the drum 39 causes the mat M to be wrapped about the drum 39 with the bottom surface BS of the blocks facing outwardly, as shown in FIG. 2, and thereby also pulling the trolley 19 forward longitudinally relative to the concrete mat M. This rotation sequentially lifts and thereby extracts each column (extending perpendicular to the path of travel of the trolley) of concrete blocks B from their respective block molds 13. The tensiles T maintain the matrix of blocks B in a uniform mat M formed as the mat is rolled about the drum 39, as shown in FIG. 2. The tensiles T also allow for the articulated rolling of the mat M, with the space S between each block B allowing for both articulation and angular positioning of adjacent columns of blocks between each column of concrete blocks B. The rolling of the mat M continues until all the blocks B are released from their respective block molds 13, i.e., until the entire mat M is released from the concrete mat formwork 12. In the illustrated embodiment with opposing planar and parallel bottom surface BS and top surface TS, the blocks B sit cooperatively relative to the underlying adjacent block so the on-coming blocks during rolling are less susceptible to lateral sliding and the roll of the mat has substantially uniform opposing sides. The rolled mat M may then be lifted for storage or for placing on a trailer for hauling to an installation site. FIG. 2A illustrates a side view of the concrete mat forming and rolling system shown in FIG. 1, in which the trolley apparatus extracts the concrete mat from a mold framework, which mat rises vertically onto a roller upon rotation to roll the mat about the roller.

Alternatively, with reference to FIG. 13, the elongated assembly of the mat formworks 12 is placed in the first casting/stripping station 76. The network of tensiles T is positioned into the slots 17 of each block mold 13, as discussed above. Each block mold 13 is then filled with uncured concrete, which is screeded or leveled to form the rough bottom surface BS of the resulting block B. Thus, the tensiles T are embedded within the block B with all blocks B of the mat M interconnected through the tensiles T. The concrete is then allowed to cure. The side surfaces SS and top surface TS formed against the walls of the mold cavity 13 have smooth surfaces.

Production of additional mats may continue. This is accomplished by overlying the screed formwork with covering sheets such as plywood sheets or plastic membrane and another elongate formwork is placed in a stack on top of the proximate covering sheet for receiving the tensiles and the concrete mixture for a subsequent mat. Multiple articulated mats are similarly formed on the stack in the first casting/stripping station 76, as the lower ones of the formed mats cure within the respective formwork.

After curing, the mats M are moved sequentially from the stack to the laydown area 80 using the hoist 75 of the crane bridge 74. The casting of mats M may continue simultaneously using the second casting/stripping station 78, similarly as discussed above for the stack of cast mats M formed in the first casting/stripping station 76.

The cured mats in the first casting/stripping station 76 are moved sequentially to the laydown area 80. The laydown area 80 is level or substantially level. The movement of the mat is accomplished using the crane bridge 74 to hoist the respective ends of the cured mat as a catenary from the formwork 12 of the mat molds 13 in the first casting/stripping station 76. An elongated member inserts through the loops L at a first end of the mat M and the hoist 75, connected to the elongated member, lifts the first end of the mat. The crane bridge 74 moves longitudinally on the rails towards the opposing end of the mat, and the hoist 75, connected to the elongated member, lifts the mat from the formwork. The opposing end of the mat receives an elongated member through the loops L, which also connects to the hoist 75. The hoist 75 lifts the mat free of the formwork 12. The crane bridge 74 moves the mat M to the laydown area 80. This is accomplished by moving the crane bridge 74 on the rails 72 longitudinally while the hoist 75 moves transverse on the crane bridge to position the mat in the laydown area 80. An end of the mat M is placed near the trolley 19 and the crane bridge 74 moves on the rails 72 towards the casting stations 76, 78 to position the mat M in the laydown area.

The moved mat is then rolled using the trolley 19 as discussed above. The trolley 19 is positioned proximate the first end of the mat M, and the loops L of the mat M are coupled to the catches 44, as shown in FIG. 5 as discussed above.

With operation of the hydraulic motor 43 and engagement of the clutch 41, the roller shaft 38, and therefore the drum 39, begins to rotate in a first direction. The hydraulic motor 43 preferably provides low rpm with high torque for moving and rotating the mat M. The rotation of the drum 39 causes the mat M to be wrapped about the drum 39 with the bottom surface BS of the blocks B outward, and thereby also pulling the trolley 19 forward longitudinally relative to the concrete mat M towards the opposing end of the mat. This rotation sequentially lifts each column (extending perpendicular to the path of travel of the trolley) of concrete blocks B and rolls the mat with the bottom surface outwardly of the rolled mat. The tensiles T maintain the matrix of blocks B in a uniform mat M formed as the mat is rolled about the drum 39, as shown in FIG. 2. The tensiles T also allow for the articulated rolling of the mat M, with the space S between each block B allowing for both articulation and angular positioning of adjacent columns of blocks between each column of concrete blocks B. In the illustrated embodiment with opposing planar and parallel bottom surface BS and top surface TS, the blocks sit cooperatively relative to the underlying adjacent block so the on-coming blocks during rolling are less susceptible to lateral sliding and the roll of the mat has substantially uniform opposing sides. The rolling of the mat M continues until the distal end of the mat is included in the roll. The rolled mat M may then be lifted, the drum 39 removed, and the mat moved to a storage location, or to a tractor trailer for transport to an installation site.

The articulating concrete block mat casting and stripping workstation 70 provides for casting of mats M in stacks in one of the casting/stripping stations 76, 78 while the cast cured mats in the other casting/stripping station are being moved for rolling at the laydown area 80. After the mat is stripped from the formwork, the formwork is moved for cleaning and preparing for a subsequent casting at the other casting/stripping station.

Now, the mat M is neatly wrapped about the drum 39 and secured so that it does not unwrap itself, such as by securing a retaining strap about the periphery of the rolled mat.

It is to be appreciated that the trolley 19 may stop its forward movement and the articulating mat M continue rolling up into the roll about the drum 39, as may occur when the mass of the remaining length of the mat M is less than the restraining force of the combined mass of the rolled mat and the trolley. Alternatively, the roller may be configured for connecting to a motivator, such as a hydraulic motor or by a drive shaft of a power take-off of a tractor, for low-rpm rotation in order to move a residual length of the mat onto the roll.

The distance between the front side rails 22 of the trolley 19 are of a first select distance while the mat M has a width of a second select distance smaller that the distance between the side rails 22 (first select distance), so that the mat M may pass between the front side rails 22 during the rolling process. The term "mat width" is intended to denote the width or distance between the edges of the mat M in a direction generally aligned along or parallel to the trolley's roller shaft 38, previously referenced as a column. This may also be thought of as the lateral direction perpendicular to the longitudinal length of the matt M.

It should be understood that the trolley 19 may be steered to maintain alignment with the mat M during the rolling process. Should a misalignment commence, the operator simply pushes the steering handle 33 in the proper direction, thereby causing the steering rods 30 to turn the rear hubs 28 and wheels 27. The mat guide plates 26 also ensure that the mat M is being brought onto the drum 39 and onto the previously rolled portion of the mat M in proper alignment. The vertical space 21 between the two side rails of the base 20 allows for rolling of the mat, as the rolled mat M diameter may extend below the top surface of the base 20 and into the space 21.

Upon completion of rolling the mat M into a roll on the roller shaft 38, the catches 44 are retracted into the drum to release loops L of the mat M by allowing the escape of pressure through the fitting 48 and inward movement of the pistons 45, the block bearing housings 37 are then opened so that the roller shaft 38 may be removed from the block bearing housings 37. A forklift or hoist may be used to lift the roll from the trolley 19 for placement on the level surface. With the rolled mat M positioned upon the surface the drum 39 and shaft 38 may then be slid out from the center of the rolled mat M, so that only the rolled mat M remains. The rolled mat M may then be lifted with the use of the forklift or other mechanical device and placed in inventory or, upon a truck, trailer or other mode of transportation for relocation to the final installation destination. In an alternate embodiment, at least one of the guide plates 26 is detachable, to facilitate removal of the rolled mat M.

Figure 12:
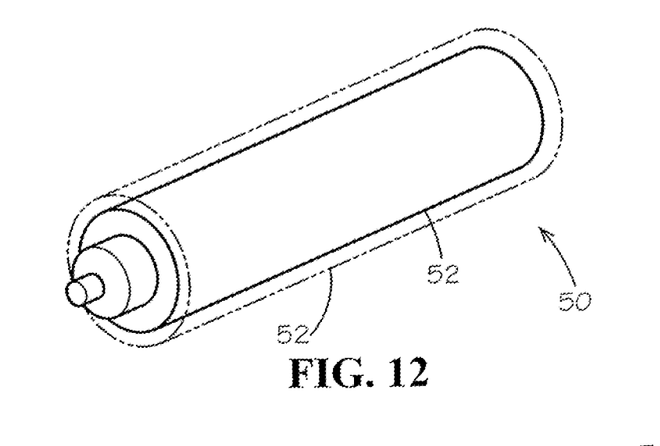
FIG. 12 illustrates an alternative embodiment of a roller useful with the trolley rolling apparatus of the concrete mat forming and rolling system.

FIG. 12 illustrates an alternative embodiment of a roller 50 for the trolley 19 of the concrete mat forming and rolling system 10. The roller 50 seats in the block bearing housings 37. An intermediate portion of the roller 50 includes a diameter-displaced bladder 52 selectively connectable to a supply of pressurized air. The bladder 52 provides the roller 50 with a first diameter and may inflate to provide the roller 50 with a second diameter shown in phantom lines, which second diameter is greater than the first diameter. With the bladder 52 inflated to the second diameter, the loops of the tensiles T connect to the catches 44 as discussed above, for rolling the mat M onto the roller. Upon completion of rolling the mat M, the catches 44 are retracted into the drum to release loops L of the mat M by allowing the escape of pressure through the fitting 48 and inward movement of the pistons 45, the bearing blocks 37 are opened for removing the roller 50 from the block bearing housings 37. The pressurized bladder 52 is opened to reduce the diameter to the first diameter. The facilitates removal of the shaft 50 from the rolled mat.

Alternatively, the expansion of the roller from a first diameter to a second diameter may be achieved mechanically through the expanding movement of the roller walls that define the roller's external diameter. For example, the roller may be made of longitudinal segments which are coupled to a camming system that moves each roller segment outwardly to expand the roller from its first diameter to its second diameter. The camming system would also return the roller segment back to their initial position defining the first diameter.

Alternatively, the collapse of the roller from the roller's external diameter may be achieved mechanically through the collapsing movement of the roller walls that define the roller's external diameter. For example, the roller may be made of longitudinal roller segments which slide together longitudinally to form a system which when one or more roller segments are removed laterally collapse the roller from its external diameter into removable roller segments. The reassembly of the roller's segments would also return the roller segment back to their initial position defining the external diameter.

Figure 11:
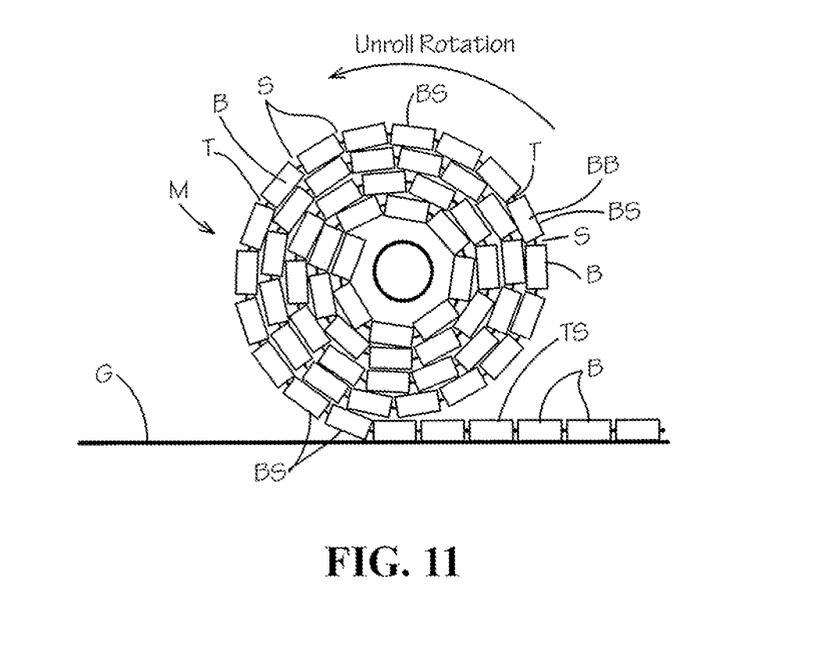
FIG. 11 illustrates a side view of a concrete mat formed by the concrete mat forming and rolling system shown in FIG. 1, shown in a partially rolled condition.

Once the mat M has been transported and positioned at the intended site of use with the rough bottom surface BS of the blocks facing downwardly at the point of contact with the level surface, the rolled mat M is simply unrolled in an opposite direction, for example, counterclockwise with respect to the drawings of FIG. 11. With this reversed direction of rolling, the bottom surface BS of the blocks B face downwardly and against the underlying surface so that the top surface TS is facing upwardly. The bottom surfaces BS of the blocks B have the rough surface 51 arising from the screed of the flowable solidifable cementious mixture at the open end of the mold cavities of the mold formwork. The rough surface provides increased frictional engagement of the articulable mattress with the ground surface. The opposing longitudinal sides, the opposing transverse sides, and the top surface TS however have smooth surfaces 51 providing uniformity of appearance of the blocks, which smooth surfaces arise from contact of the cement mixture with the walls of the mold cavities.

The unrolling of the mat M may be accomplished either with the use of a machine to push the rolled mat M, or by gravity if the rolled mat is positioned on a sufficiently sloped surface. For example, the installation site may be land/watershed ground for overlying with the anti-erosion mat M as a covering, and the ground may alternatively be first covered with a straw mat or woven mat prior to placement and unrolling of the mat M, as well as receiving seeding for vegetation growth through the mat M. The present invention provides an articulable elongated mat of interconnected tensile-joined plurality of blocks rolled for readily unrolling on a site for facilitating ground erosion control and vegetated growth while providing a walkable surface that is substantially wide and flat across ground surfaces which may be planar or sloped.

The foregoing discloses the simplified assembly and casting manufacture, and transport and use, of an articulating mat mattress of a plurality of longitudinally and transversely spaced-apart blocks interconnected with tensiles received in the slots of the blocks and seated for self-supporting on the distal extent bottom of the slots during casting with reduced labor and manufacturing time over prior art assembled articulating mat mattresses. The structure of the cast blocks provides dimensional stability of the tensiles as the flowable material cures solidly around the tensiles. The five exposed surfaces of the cast block in the illustrative embodiment have similar smooth finished surfaces while the bottom side being cast upwardly has a screed rough finish preferable for frictionally engaging the ground surface during installation and use of the mattress for erosion control with reduced slippage.

The foregoing further discloses a concrete mat forming and rolling system that comprises a base, a plurality of wheels coupled to the base, a roller coupled to the base for rotational movement, the roller having at least one mat catch which secures an end of a concrete mat to the roller, and a motor coupled to the roller to cause rotation of the roller.

In another form, the foregoing discloses a method of forming and rolling a length of concrete block mat for installation at a site, which comprises the steps of providing a concrete mat formwork configured to form a mat of interconnected concrete blocks, inserting a network of tensiles within the formwork for interconnecting of the concrete blocks, casting concrete into the formwork with a bottom surface of the concrete blocks facing upwardly, curing the concrete blocks, providing a roller, coupling a leading edge of the mat of interconnected concrete blocks to the roller, rotating the roller in a first direction to extract the mat of interconnected concrete blocks from the concrete mat formwork and to roll the mat of interconnected concrete blocks about the roller with the bottom surface of the mat of interconnected concrete blocks facing outwardly, whereby the rolled mat of interconnected concrete blocks being transported to an installation site, for placing the rolled mat of interconnected concrete blocks upon a surface at the installation site with the bottom surface of the mat of interconnected concrete blocks facing downwardly at the point of contact with the surface, and unrolling the rolled mat of interconnected concrete blocks upon the surface at the installation site.

In another form, the foregoing discloses a method of forming and installing a length of concrete block mat, which comprises the steps of providing a concrete mat formwork configured to form a mat of interconnected concrete blocks, inserting a network of tensiles within the formwork for interconnecting of the concrete blocks, casting concrete into the formwork with a bottom surface of the concrete blocks facing upwardly, curing the concrete blocks, removing the concrete mat from the formwork, placing the concrete mat on a surface, providing a roller, coupling a leading edge of the mat of interconnected concrete blocks to the roller, rotating the roller in a first direction to lift the mat from the surface and to roll the mat of interconnected concrete blocks about the roller with the bottom surface of the mat of interconnected concrete blocks facing outwardly, whereby the rolled mat of interconnected concrete blocks being transported to an installation site for placement on a surface with the bottom surface of the mat of interconnected concrete blocks facing downwardly at a point of contact with the surface at the installation site, and unrolling the rolled mat of interconnected concrete blocks upon the surface at the installation site.

In another form, the foregoing provides a method of rolling a concrete block mat having a plurality of cement blocks interconnected in spaced relation with a network of tensiles, the concrete mat cast in a formwork configured for receiving the tensiles and cement with a bottom surface of the concrete blocks facing away from the formwork, comprising the steps of:

(A) coupling to a rotatable roller a leading edge of a mat of concrete blocks interconnected by a plurality of tensiles;

(B) rotating the roller in a first direction and rolling the mat of interconnected concrete blocks about the roller inverted with the bottom surface of the mat of interconnected concrete blocks facing outwardly, whereby the rolled mat of interconnected concrete blocks being transported to an installation site for placing upon a surface at the installation site with the bottom surface of the mat of interconnected concrete blocks facing downwardly at a point of contact with the surface, and unrolling the rolled mat of interconnected concrete blocks in a second direction upon the surface at the installation site.

It should be understood that the catch 44 may alternatively be other types of conventionally known couplers.

It should be understood that as an option, the hydraulic motor 43 may be coupled to a front wheel 24 or rear wheel 27, so that operation of the hydraulic motor 43 also drives the wheel. The wheels and roller may interconnect by a chain drive.

It should be understood that the frame 20 may include additional supports, such as a cross-member extending between the side rails 22 adjacent the front end of the base.

It should also be understood that the wheels 24 and 27 may be in the form of steel wheels adapted to ride upon a pair of spaced-apart rails. Lastly, it should be understood that the front wheels may be made steerable, rather than the rear wheels.

The foregoing provides a description of an illustrative embodiment of the invention directed to an articulable erosion control mattress having a plurality of interconnected spaced-apart blocks that each have a rough bottom surface for frictionally engaging a ground surface for erosion control with sides and top smooth surfaces, as well as a system for forming and rolling the flexible concrete mattress and more particularly, a system and method of rolling the flexible concrete mattress such that the erosion control mattress is inverted for installation by unrolling on an installation site. Those skilled in the art may recognize other modifications, changes, and equivalents to the specific illustrative embodiment described herein which other modifications, changes, and equivalents are intended to be encompassed by the claims attached hereto.

What is claimed is:

1. A concrete mat forming and rolling system, comprising:
   a base;
   a plurality of wheels coupled to said base;
   a roller coupled to said base for rotational movement, said roller having at least one mat catch which secures an end of a flexible concrete mat to the roller, and
   a motor coupled to said roller to cause rotation of said roller.

2. The concrete mat forming and rolling system as recited in claim 1, wherein said roller includes a drum, and wherein said catch is reciprocally mounted to said drum for movement between a retracted position within said drum and an extended position extending outwardly from said drum.

3. The concrete mat forming and rolling system as recited in claim 2, wherein said drum includes a piston chamber, and wherein said mat catch includes a piston mounted within said piston chamber for reciprocal movement therein.

4. The concrete mat forming and rolling system as recited in claim 1, wherein said roller is removably coupled to said base.

5. The concrete mat forming and rolling system as recited in claim 1, further comprising a clutch coupled to said motor.

6. The concrete mat forming and rolling system as recited in claim 1, wherein at least one wheel of said plurality of wheels is steerable.

7. The concrete mat forming and rolling system as recited in claim 1, wherein said base is a U-shaped base defining a space, and wherein said roller is positioned within or above said space of said base.

8. The concrete mat forming and rolling system as recited in claim 1, further comprising a mat formwork sized and shaped to be positioned between said plurality of wheels.

9. The concrete mat forming and rolling system as recited in claim 1 a concrete mat shaped to be positioned between said plurality of wheels.

10. The concrete mat forming and rolling system as recited in claim 1, wherein the roller further comprises means for expanding the diameter of said roller.

11. The concrete mat forming and rolling system as recited in claim 10, wherein said means for expanding the diameter of said roller comprises a bladder expandable between a first diameter and a second diameter, said second diameter being greater than said first diameter,
whereby the bladder is deflated to its first diameter to facilitate removal of the roller from the rolled mat.

12. A concrete mat forming and rolling system for use in forming a concrete mat and rolling the concrete mat for transportation to an installation site, comprising:
a movable trolley having a base, a pair of first wheels coupled to said base a first select distance from each other, and a mat roller system mounted to said base, said roller system including a roller and a roller drive for forcibly rotating said roller, and said roller having a mat coupler, and
a concrete mat formwork having a plurality of mutually aligned block molds, said concrete mat formwork having a width of a second select distance less than said first select distance,
whereby a concrete mat being formed within the concrete mat mold formwork is coupled to the roller of the movable trolley, whereby rotation of the roller causes the concrete mat to rise and be rolled about the roller.

13. The concrete mat forming and rolling system as recited in claim 12, further comprising a concrete mat formed within the concrete formwork having a plurality of mutually aligned blocks, said concrete mat having a width of a second select distance less than said first select distance.

14. The concrete mat forming and rolling system as recited in claim 12, wherein said roller includes a drum, and wherein said mat coupler is reciprocally mounted to said drum for movement between a retracted position within said drum and an extended position extending outwardly from said drum.

15. The concrete mat forming and rolling system as recited in claim 14, wherein said drum includes a piston chamber, and wherein said mat coupler includes a piston mounted within said piston chamber for reciprocal movement therein.

16. The concrete mat forming and rolling system as recited in claim 12, wherein said roller is removably coupled to said base.

17. The concrete mat forming and rolling system as recited in claim 12, wherein said roller drive includes a motor and a clutch coupled to said motor.

18. The concrete mat forming and rolling system as recited in claim 12, further comprising a pair of second wheel, and wherein one pair of wheels is steerable.

19. The concrete mat forming and rolling system as recited in claim 12, wherein said base is a U-shaped base defining a space, and wherein said roller is positioned within or above said space of said base.

20. The concrete mat forming and rolling system as recited in claim 12, wherein the roller further comprises means for expanding the diameter of said roller.

21. The concrete mat forming and rolling system as recited in claim 12, wherein said means for expanding the diameter of said roller comprises a bladder expandable between a first diameter and a second diameter, said second diameter being greater than said first diameter, whereby the bladder is deflated to its first diameter to facilitate removal of the roller from the rolled mat.

22. A method of forming and rolling a length of concrete block mat for instillation at a site, comprising the steps of:

(a) providing a concrete mat formwork configured to form a mat of interconnected concrete blocks with a bottom surface of the concrete blocks facing upwardly;
(b) casting concrete into the formwork and curing the concrete;
(c) providing a cart having a rotating roller;
(d) coupling a leading edge of the mat of interconnected concrete blocks to the roller; and
(e) rotating the roller in a first direction to extract the mat of interconnected concrete blocks from the concrete mat formwork and rolling the mat of interconnected concrete blocks about the roller with the bottom surface of the mat of interconnected concrete blocks facing outwardly;
whereby transporting the rolled mat of interconnected concrete blocks to an installation site for placing the rolled mat of interconnected concrete blocks upon a surface at the installation site with the bottom surface of the mat of interconnected concrete blocks facing downwardly at the point of contact with the surface, and
unrolling the rolled mat of interconnected concrete blocks upon the level surface at the installation site.

23. The method of forming and rolling a length of concrete block mat as recited in claim 22, wherein step (b) the roller includes at least one retractable catch and wherein step (c) the mat of interconnected concrete blocks is releasably coupled to the retractable catch.

24. The method of forming and rolling a length of concrete block mat as recited in claim 22, wherein the roller is disconnected from the mat of interconnected concrete blocks prior to unrolling the rolled mat of interconnected concrete blocks at the installation site.

25. The method of forming and rolling a length of concrete block mat as recited in claim 22, further comprising the step of reducing a diameter of the roller from a second diameter to a first diameter, the second diameter being greater than the first diameter, to facilitate removing of the roller from the rolled mat.

26. A method of forming and installing a length of concrete block mat, comprising the steps of:
(a) providing a concrete mat formwork configured to form a mat of interconnected concrete blocks;
(b) inserting a network of tensiles and casting concrete into the formwork with a bottom surface of the concrete blocks facing upwardly;
(c) curing the concrete blocks;
(d) removing the concrete mat from the formwork and placing on a first surface;
(d) providing a rotatable roller;
(f) coupling a leading edge of the mat of interconnected concrete blocks to the roller; and
(g) rotating the roller in a first direction to lift the interconnected concrete blocks of the concrete mat from the first surface and rolling the mat of interconnected concrete blocks about the roller inverted with the bottom surface of the mat of interconnected concrete blocks facing outwardly;
whereby the rolled mat of interconnected concrete blocks being transported to an installation site for placing upon a second surface at the installation site with the bottom surface of the mat of interconnected concrete blocks facing downwardly at the point of contact with the second surface, and unrolling the rolled mat of interconnected concrete blocks upon the second surface at the installation site.

27. The method of forming and installing a length of concrete block mat as recited in claim 26, wherein step (e) the roller includes at least one retractable catch and wherein step (f) the mat of interconnected concrete blocks is releasably coupled to the retractable catch.

28. The method of forming and installing a length of concrete block mat as recited in claim 26, wherein the roller is disconnected from the mat of interconnected concrete blocks prior to detaching the roller from the trolley.

29. The method of forming and installing a length of concrete block mat as recited in claim 26, further comprising the step of reducing a diameter of the roller from a second diameter to a first diameter, the second diameter being greater than the first diameter, to facilitate removing of the roller from the rolled mat.

30. A method of rolling a concrete block mat having a plurality of cement blocks interconnected in spaced relation with a network of tensiles, the concrete mat cast in a formwork configured for receiving the tensiles and cement with a bottom surface of the concrete blocks facing away from the formwork, comprising the steps of:
- (a) coupling to a rotatable roller a leading edge of a mat of concrete blocks interconnected by a plurality of tensiles;
- (b) rotating the roller in a first direction and rolling the mat of interconnected concrete blocks about the roller inverted with the bottom surface of the mat of interconnected concrete blocks facing outwardly, whereby the rolled mat of interconnected concrete blocks being transported to an installation site for placing upon a surface at the installation site with the bottom surface of the mat of interconnected concrete blocks facing downwardly at a point of contact with the surface, and unrolling the rolled mat of interconnected concrete blocks in a second direction upon the surface at the installation site.

\* \* \* \* \*